(12) United States Patent
Kuhns et al.

(10) Patent No.: US 8,396,821 B2
(45) Date of Patent: Mar. 12, 2013

(54) UTILITY MONITORING SYSTEMS AND METHODS OF USE

(75) Inventors: Hampden Kuhns, Reno, NV (US);
Peter R. Edwards, Reno, NV (US);
George Nikolich, Las Vegas, NV (US);
Morien W. Roberts, Reno, NV (US)

(73) Assignee: Board of Regents of the Nevada System of Higher Education, on Behalf of the Desert Research Institute, Reno, NV (US)

( * ) Notice: Subject to any disclaimer, the term of this patent is extended or adjusted under 35 U.S.C. 154(b) by 0 days.

(21) Appl. No.: 12/982,460

(22) Filed: Dec. 30, 2010

(65) Prior Publication Data

US 2011/0238311 A1    Sep. 29, 2011

Related U.S. Application Data

(62) Division of application No. 12/301,962, filed as application No. PCT/US2006/048134 on Dec. 15, 2006, now Pat. No. 7,885,917.

(60) Provisional application No. 60/803,323, filed on May 26, 2006.

(51) Int. Cl.
| G06F 17/00 | (2006.01) |
| G06N 5/02 | (2006.01) |
| G01R 23/16 | (2006.01) |
| G01R 27/02 | (2006.01) |
| G01R 13/00 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |

(52) U.S. Cl. .......... 706/48; 324/76.12; 702/66; 700/286

(58) Field of Classification Search ............... 706/14, 706/48; 702/61, 66, 70; 700/286; 324/76.12
See application file for complete search history.

(56) References Cited

U.S. PATENT DOCUMENTS
(Continued)

FOREIGN PATENT DOCUMENTS
| CN | 1251158 | 4/2006 |
| EP | 1489719 | 12/2004 |

(Continued)

OTHER PUBLICATIONS

Baranski, M. et al. "Genetic Algorithm for Pattern Detection in NIALM Systems" 2004 IEEE International COnference on Systems, Man and Cybernetics. 2004. pp. 3462-3468.*

(Continued)

*Primary Examiner* — Jeffrey A Gaffin
*Assistant Examiner* — Benjamin Buss
(74) *Attorney, Agent, or Firm* — Klarquist Sparkman, LLP

(57) ABSTRACT

Various embodiments of the present disclosure provide methods, systems, and devices for monitoring one or more utilities consumed within a monitored area. At least certain disclosed methods include detecting an amount of a first utility consumed by a load associated with a device. An amount of a second utility consumed by a load associated with the device is detected. The identity of the device is determined based on the amount of the first and second utility consumed. In further disclosed methods, a utility monitoring method is disclosed that includes measuring an amount of a utility consumed by a first device at a first time and an amount of a utility consumed by a second device at a second time. The identity of the first device is determined based on the measured consumption of the first and second devices at the first and second time. In certain implementations, the electricity meter uses an effective variance analysis of the conductance waveform on an electrical circuit to identify specific appliances.

16 Claims, 11 Drawing Sheets

U.S. PATENT DOCUMENTS

| | | | |
|---|---|---|---|
| 4,644,320 | A | 2/1987 | Carr et al. |
| 4,858,141 | A * | 8/1989 | Hart et al. ..................... 702/61 |
| 5,483,153 | A | 1/1996 | Leeb et al. |
| 5,635,895 | A | 6/1997 | Murr |
| 5,717,325 | A | 2/1998 | Leeb et al. |
| 6,836,737 | B2 | 12/2004 | Petite et al. |
| 6,944,523 | B2 | 9/2005 | Addink et al. |
| 7,693,670 | B2 | 4/2010 | Durling |
| 2001/0010032 | A1 | 7/2001 | Ehlers et al. |
| 2002/0161536 | A1 | 10/2002 | Suh et al. |
| 2003/0009301 | A1 | 1/2003 | Anand et al. |
| 2005/0060107 | A1 | 3/2005 | Rodenberg, III et al. |
| 2005/0065742 | A1 | 3/2005 | Rodgers |
| 2005/0190074 | A1 | 9/2005 | Cumeralto et al. |
| 2010/0109842 | A1 | 5/2010 | Patel |

FOREIGN PATENT DOCUMENTS

| | | |
|---|---|---|
| KR | 10-2006-0039171 | 5/2006 |
| WO | WO 2007/139587 | 12/2007 |
| WO | WO 2009/103998 | 8/2009 |

OTHER PUBLICATIONS

Pihala,H. "Non-intrusive appliance load monitoring system based on a modern kWh-meter" VTT Publications 356. Technical Research Centre of Finland. 1998.*

Farinaccio,L. et al. "Using a pattern recognition approach to disaggregate the total electricity consumption in a house into the major end-uses". Energy and Buildings 30 (1999). pp. 245-259.*

Hart,G.W. "Nonintrusive Appliance Load Monitoring" IEEE. 1992. pp. 1870-1891.*

Tsuji,K. et al. "An End-Use Energy Demand Monitoring Project for Estimating the Potential of Energy Savings in the Residential Sector" In: ACEEE summer study on energy efficiency in buildings, vol. 2. 2000. pp. 311-322.*

Cole, A.I. et al. "Algorithm for Non-Intrusive Identification of Residential Appliances". ISCAS '98: Proceedings of the 1998 IEEE International Symposium on Circuits and Systems, 1998. pp. 338-341.*

Cole, A.I. et al. "Data extraction for effective non-intrusive identification of residential power loads". IEEE Instrumentation and Measurement Technology Conference, 1998. IMTC/98. Conference Proceedings. IEEE, 1998. pp. 812-815.*

Prudenzi, A. "A Neuron Nets Based Procedure for Identifying Domestic Appliances Pattern-of-Use from Energy Recordings at Meter Panel". Power Engineering Society Winter Meeting, 2002. IEEE. pp. 941-946.*

Akbar & Khan, "Modified Noninstrusive Appliance Load Monitoring for Nonlinear Devices," *Multitopic Conference INMIC, IEEE International* 1-5, 2007.

Amano et al., "Artificial Neural Nets for Non-Intrusive Load Monitoring," *Proceeding of ICEE2K* 437-440, 2000.

Baranski & Voss, "Nonintrusive appliance load monitoring based on an optical sensor," *Power Tech Conference Proceedings*, 2003 IEEE Bologna, 4:4-8, 2003.

Baranski & Voss, "Detecting patterns of applicances from total load data using a dynamic programming approach," *Data Mining, 2004. ICDM '04, Fourth IEEE International Conference*, 327-330, 2004.

Baranski & Voss, "Genetic algorithm for pattern detection in NIALM systems," *Systems, Man and Cybernetics, 2004 IEEE International Conference*, 4:3462-3468, 2004.

Bennett, P., "Using the non-intrusive load monitor for shipboard supervisory control," Thesis, Massachusetts Institute of Technology, 2007. http://dspace.mit.edu/handle/1721.1/39731.

Chang et al., "Load Recognition for Different Loads with the Same Real Power and Reactive Power in a Non-intrusive Load-monitoring System," *Computer Supported Cooperative Work in Design* 1122-1127, 2008.

Cohn et al., "GasSense: Appliance-Level, Single-Point Sensing of Gas Activity in the Home," *Proceedings of Pervasive* (May 17-20, Helsinki, Finland), Springer-Verlag, Heidelberg, 265-282, 2010.

Darby, S., "The Effectiveness of Feedback on Energy Consumption," *A Review for DEFRA of the Literature on Metering, Billing and Direct Displays*, Apr. 2006.

De Almeida & Vine, "Advanced monitoring technologies for the evaluation of demand-side management programs," *Power Systems, IEEE Transactions* 9(3):1691-1697, 1994.

Denucci, T., "Diagnostic indicators for shipboard systems using nonintrusive load monitoring," Thesis, Massachusetts Institute of Technology, 2005. http://dspace.mit.edu.handle/1721.1/33576.

Drenker & Kader, "Nonintrusive monitoring of electric loads," *Computer Applications in Power, IEEE* 12(4):47-51, 1991.

Farinaccio & Zmeureanu, "Using a pattern recognition approach to disaggregate the total electricity consumption in a house into the major end-uses," *Energy and Buildings* 30(3):245-259, 1999.

Fitzpatrick, M., "Energy diary helps correct bad habits," *New Scientist* 2538, Dec. 2, 2005.

Froehlich et al., "HydroSense: infrastructure-mediated single-point sensing of whole-home water activity," *Proceedings of the 11th International Conference on Ubiquitous Computing* (Orlando, Florida, USA, Sep. 30-Oct. 3, 2009), 235-244, 2009.

Fuentes et al., "Development and assessment of a load decomposition method applied at the distribution level," *Generation, Transmission and Distribution, IEE Proceedings* 150(2):245-251, 2003.

Hart, G.W., "Nonintrusive Appliance Load Monitoring," *Proceedings of the IEEE* 80(12):1870-1891, 1992.

Hart, G.W., "Residential energy monitoring and computerized surveillance viautility power flows," *Technology and Society Magazine, IEEE* 8(2):12-16, 1989.

House et al., "Controls and Diagnostics for Air Distribution Systems," *Journal of Solar Energy Engineering* 125(3):310-317, 2003.

Khan et al., "A multiprocessor for transient event detection," *Power Delivery, IEEE Transactions* 12(1):51-60, 1997.

Kim et al., "NAWMS: Nonintrusive Autonomous Water Monitoring System," *The 6th ACM Conference on Embedded Networked Sensor Systems* (SenSys 2008).

Kim et al., "ViridiScope: Design and Implementation of a Fine Grained Power Monitoring System for Homes,"*11th International Conference on Ubiquitous Computing* (UbiComp 2009), Sep.-Oct. 2009.

Laughman et al., "Power signature analysis," *Power and Energy Magazine, IEEE* 1(2):56-63, 2003.

Lee et al., "Estimation of Variable-Speed-Drive Power Consumption From Harmonic Content," *Energy Conversion, IEEE Transaction* 20(3):566-574, 2005.

Lee et al., "Development of a Functioning Centrally Located Electrical-Load Monitor," California Energy Commission, May 27, 2003.

Lee, K., "Electric load information system based on non-intrusive power monitoring," Thesis, Massachusetts Institute of Technology, 2003. http://dspace.mit.edu/handle/1721.1/29633?show=full.

Lee et al., "Exploration on Load Signatures," *Proceedings of the International Conference on Electrical Engineering (ICEE)*, 2004.

Leeb, S.B., "A conjoint pattern recognition approach to nonintrusive load monitoring," Masters Thesis, Massachusetts Institute of Technology, 1993.

Leeb et al., "Transient event detection in spectral envelope estimates for nonintrusive load monitoring," *Power Delivery, IEEE Transactions* 10(3):1200-1210, 1995.

Liang et al., "Load Signature Study—Part I: Basic Concept, Structure, and Methodology," *Power Delivery, IEEE Transactions* 25(2):551-560, 2010.

Liang et al., "Load Signature Study—Part II: Disaggregation Framework, Simulation, and Applications," *Power Delivery, IEEE Transactions* 25(2):561-569, 2010.

Lisovich & Wicker, "Privacy Concerns in Upcoming Residential and Commercial Demand-Response Systems," *IEEE Proceedings on Power Systems* 1:1-10, 2008.

Luo et al., "Monitoring HVAC equipment electrical loads from a centralized location—methods and field test results," *ASHRAE Transactions* 108(1):841-857, 2002.

Marceau & Zmeureanu, "Nonintrusive load disaggregation computer program to estimate the energy consumption of major end-uses in residential buildings," *Energy Conversion and Management Journal* 41(13):1389-1403, 2000.

Mielczarski et al., "Non-intrusive identification of residential customers," *Energy* 22(11):1103-1109, 1997.
Moreno et al., "An integrated tool for assessing the demand profile flexibility," *Power Systems, IEEE Transactions* 19(1):668-675, 2004.
Murata et al., "Applying Kernel Based Subspace Classification to a Non-intrusive Monitoring for Household Electric Appliances," *Artificial Neural Networks—ICANN* 692-698, 2001.
Najmeddine et al., "State of the art on load monitoring methods," *2nd IEEE International Conference on Power and Energy* (PECON08) Johor Baharu, Malaysia, Dec. 1-3, 2008.
Norford & Leeb, "Non-intrusive electrical load monitoring in commercial buildings based on steady-state and transient load-detection algorithms," *Energy and Buildings* 24(1):51-64, 1996.
Norford et al., "Demonstration of fault detection and diagnosis methods for air-handling units," *ASHRAE Transactions* 108(1):469, 2002.
Onoda et al., "Applying Support Vector Machines and Boosting to a Non-Intrusive Monitoring System for Household Electric Appliances with Inverters," *NC '2000*, 7, 2000.
Paris, J., "A framework for non-intrusive load monitoring and diagnostics," Masters Thesis, Massachusetts Institute of Technology, 2006. http://hdl.handle.net/1721.1/37081.
Patel et al., "The design and evaluation of an end-user-deployable, whole house, contactless power consumption sensor," *Proceedings of the 28th International Conference on Human Factors in Computing Systems* 2471-2480, 2010.
Patel et al., "A the Flick of a Switch: Detecting and Classifying Unique Electrical Events on the Residential Power Line," *Proceedings of Ubicomp* 271-288, 2007.
Qin & Wang, "A fault detection and diagnosis strategy of VAV air-conditioning systems for improved energy and control performances," *Energy and Buildings* 37(10):1035-1048, Oct. 2005.
Sharp, T.R., "Development and application of a high-speed, high-resolution data acquisition system for monitoring power at the service entrance to buildings," Feb. 1, 1995. http://www.osti.gov/bridge/purl.cover.jsp?purl=34377-DShuGn/webviewable/.
Shaw et al., "Detection and Diagnosis of HVAC Faults via Electrical Load Monitoring," *HVAC&R Research*, 2002.
Shaw & Leeb, "Identification of induction motor parameters from transient stator current measurements," *Industrial Electronics, IEEE Transactions* 46(1):139-149, 1999.
Shenavar & Farjah, "Novel embedded real-time NILM for electric loads disaggregating and diagnostic," *EUROCON, 2007, The International Conference on "Computer as a Tool,"* 1555-1560, 2007.
Ueno et al., "Determination of standby power from the monitored load duration curves for home appliances," *Proceedings of the 2011 Australasian University Power-Engineering Conference*, 245-250, 2001.
Ueno et al., "Effectiveness of an energy-consumption information system on energy savings in residential houses based on monitored data," *Applied Energy* 83(2):166-183, Feb. 2006.
Yamagami et al., "Non-intrusive submetering of residential gas appliances," 1996. http://www.osti.gov/bridge/servlets/purl/418458-G5mjhw/webviewable/.
USPTO Patent Database Search Results: abst/utility and abst/meter and power and appliance 1976 to present db, 23 hits, 2 pages (Apr. 3, 2006).
USPTO Patent Database Search Results: abst/utility and abst/meter 1976 to present db, 362 hits, 15 pages (Apr. 3, 2006).
USPTO PreGrant Publication Database Search Results: abst/utility and abst/meter and power and appliance, 15 hits, 1 page (Apr. 3, 2006).
USPTO PreGrant Publication Database Search Results: abst/utility and abst/meter, 144 hits, 6 pages (Apr. 3, 2006).
Enetics Speed Products Power Web Demo, http://www.enetics.com/prodmainSPEED.html, printed Mar. 8, 2006.
International Search Report and Written Opinion issued Jun. 18, 2007 for PCT Application No. PCT/US2006/048134.

* cited by examiner

UTILITY MONITORING SYSTEMS AND METHODS OF USE

CROSS REFERENCE TO RELATED APPLICATION

This application is a divisional of U.S. patent application Ser. No. 12/301,962, filed Nov. 21, 2008 now U.S. Pat. No. 7,885,917, which is the U.S. National Stage of International Application No. PCT/US2006/048134, filed Dec. 15, 2006, which was published in English under PCT Article 21(2), which in turn claims the benefit of U.S. Provisional Patent Application No. 60/803,323, filed May 26, 2006. Each of these applications is incorporated by reference herein in its entirety.

TECHNICAL FIELD

The present application relates generally to utility monitors and their methods of use. In particular examples, the present application provides a non-intrusive utility monitor which can be used to monitor a plurality of discrete loads.

BACKGROUND

In most residences and small businesses, utility consumers learn about their utility consumption through a bill delivered once per month. This system has limited ability to promote conservation since the consumer does not have feedback to associate their specific activities to a particular cost. This lack of information can result in a disconnect between the perception of utility costs and their actual costs. The lack of timely and/or specific information can also lead to inefficiencies and poor decision making by individuals. Although gasoline prices are often a top concern for consumers, the average household spends more than twice as much on utilities as on gasoline. In 2003, an average household spent $2811 on residential utilities, fuels, and public services; while spending $1333 on gasoline and motor oil.

Large commercial businesses commonly employ technology for energy and utility management. Typically a building engineer reviews utility consumption data to ensure utilities are consumed in a cost effective manner. This technology has not penetrated the small business and residential market due to the system and installation expense. Moreover, the data provided by typical existing systems is not presented in a way that non-technical users can understand. Existing monitoring systems also typically do not monitor multiple utilities (i.e. natural gas, electric power, and water), or correlate the use of different utilities to one another.

Many existing electricity monitoring devices attach sensors to each electrical appliance to be monitored. However, attaching sensors and transmitters to numerous appliances in the areas to be monitored can add substantial cost to the system. Such a configuration can also increase the complexity of the system and the difficulty of installing it.

Some existing systems monitor electric loads at the point of service entry into the areas to be monitored, such as an electrical meter installed by a power company. However, such systems typically only analyze overall electricity use and do not analyze use by individual circuits or appliances.

SUMMARY

The present disclosure provides apparatus, systems, and methods for monitoring one or more utilities. In a particular embodiment, the present disclosure provides a utility monitoring method that improves on the above mentioned methods that are currently employed. An amount of a first utility consumed by a load associated with a device is detected. An amount of a second utility consumed by a load associated with the same device is detected. The identity of the device is determined based on the amount of the first and second utilities consumed. In a specific example, the first utility is electricity and the second utility is gas. In another example, the first utility is electricity and the second utility is water. In a further example, the first utility is water and the second utility is gas. In particular examples, electricity use is analyzed using a non-intrusive load monitoring algorithm, such as an effective variance analysis of the conductance waveform on an electrical circuit.

According to a further disclosed utility monitoring method, an amount of a utility consumed by a first device at a first time is measured. An amount of a utility consumed by a second device at a second time is measured. The first device is identified based on the measured consumption of the first and second devices.

In various disclosed methods, the time of day of the use, the duration of use, or the separation of time between uses are used to help identify the first device. In yet further methods sequence-based heuristics are used to identify which sequence of utility consumption is more probable.

The present disclosure also provides an energy monitoring system. In a particular embodiment, the energy monitoring system includes an electricity meter and another utility meter, such as a water meter or natural gas meter; a signal processor; and a user interface device or user computer in communication with the electricity meter and the other utility meter. In certain implementations, the electricity meter includes a non-intrusive load monitor algorithm, such as an effective variance analysis of the conductance waveform on an electrical circuit. In specific examples, the electricity meter is in communication with each of a plurality of circuits. In such examples, the system need not include the water meter. Some implementations of the electricity meter include a signal processor.

In particular implementations that include an electricity meter in communication with each of a plurality of circuits, the electricity meter includes a power line modem or wireless transceiver. In further implementations, the electricity meter has multiple monitoring channels, each channel being in communication with a current transducer or voltage sensor attached to a circuit of a monitored area. In one example, each channel is in communication with a circuit at a circuit box, or fuse box, servicing a monitored area.

Certain embodiments of the present disclosure include a user interface device. The user interface device is in communication with one or more utility meters. The user interface, in some examples, processes data from the utility meters, such as with a signal processor. In certain implementations, the user interface device includes a user input device and a display. The display may be used to communicate utility consumption information to the user. The user input device may be used by the user to select utility information to view, or to control operation of the utility monitoring system.

In some embodiments of the disclosed systems, the user's computer is in communication with the utility meters. The user computer may also be used to process data (such as with a signal processor), display information to the user, or allow the user to control the monitoring system.

In further embodiments, the user interface device serves as an interface between the utility meters and a user's computer. The user's computer may be used to display utility consumption information and other information to the user. The user's computer may also be used by the user to control the utility monitoring system. In yet further embodiments, the user's computer or remote system may communicate with the user interface using a network protocol, such as TCP/IP.

In various embodiments, the user's computer or user interface device may be in communication with a remote network, such as with or through the internet. A remote network computer may store data from the utility meters, process such data, and transmit data to the user interface device or user's computer. For example, the remote network computer may contain profiles of various utility loads for comparison against the user's monitored area, such as for load identification or benchmarking. In other embodiments, load profiles are stored on the user's computer, the user interface device, or the signal processor. The remote system may be used to transmit applicable advertisements or offers to the user, in some examples such offers originate from appliance vendors, service organizations, or home improvement companies.

Additional embodiments provide methods for identifying an electrical device based on the electrical consumption of the device. One such method includes measuring the voltage and current consumed by the appliance at a plurality of times. The conductance of the device is determined at each of the plurality of times. The device is identified based on the change in conductance over time. In some implementations, the device is identified by comparing the change in conductance over time to a reference value. In further implementations the change in conductance over time is analyzed using statistical analysis, such as subjecting the change in conductance over time to a least squares analysis, for example, an analysis of the effective variance of the conductance. In a specific example, the time over which the conductance is measured is at least about one minute. In a further example, the conductance is measured once per voltage cycle.

The disclosed methods, systems, and apparatus can allow users to receive data regarding utility consumption relatively concurrently with such use. The availability of such data can better aid users in adjusting their utility use. In a particular example, consumption data is converted to an estimate of the environmental impacts of the utility consumption, such as an estimate of greenhouse gas emissions. The present disclosure can also allow utility consumption to be more easily, conveniently, and accurately attributed to various sources of consumption. In particular methods, the present disclosure allows the thermal efficiency of a monitored area to be measured. Such measurements can be used to help guide purchasing or renovation decisions for the monitored area.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. Any particular embodiment need not provide all features noted above, nor solve all problems or address all issues in the prior art noted above.

BRIEF DESCRIPTION OF THE DRAWINGS

Various embodiments are shown and described in connection with the following drawings in which.

DETAILED DESCRIPTION

As used herein, the singular forms "a," "an," and "the" refer to one or more than one, unless the context clearly dictates otherwise. As used herein, the term "includes" means "comprises." Unless the context clearly indicates otherwise, the disjunctive "or" includes the conjunctive "and."

Utility Monitoring Systems

Figure 1:
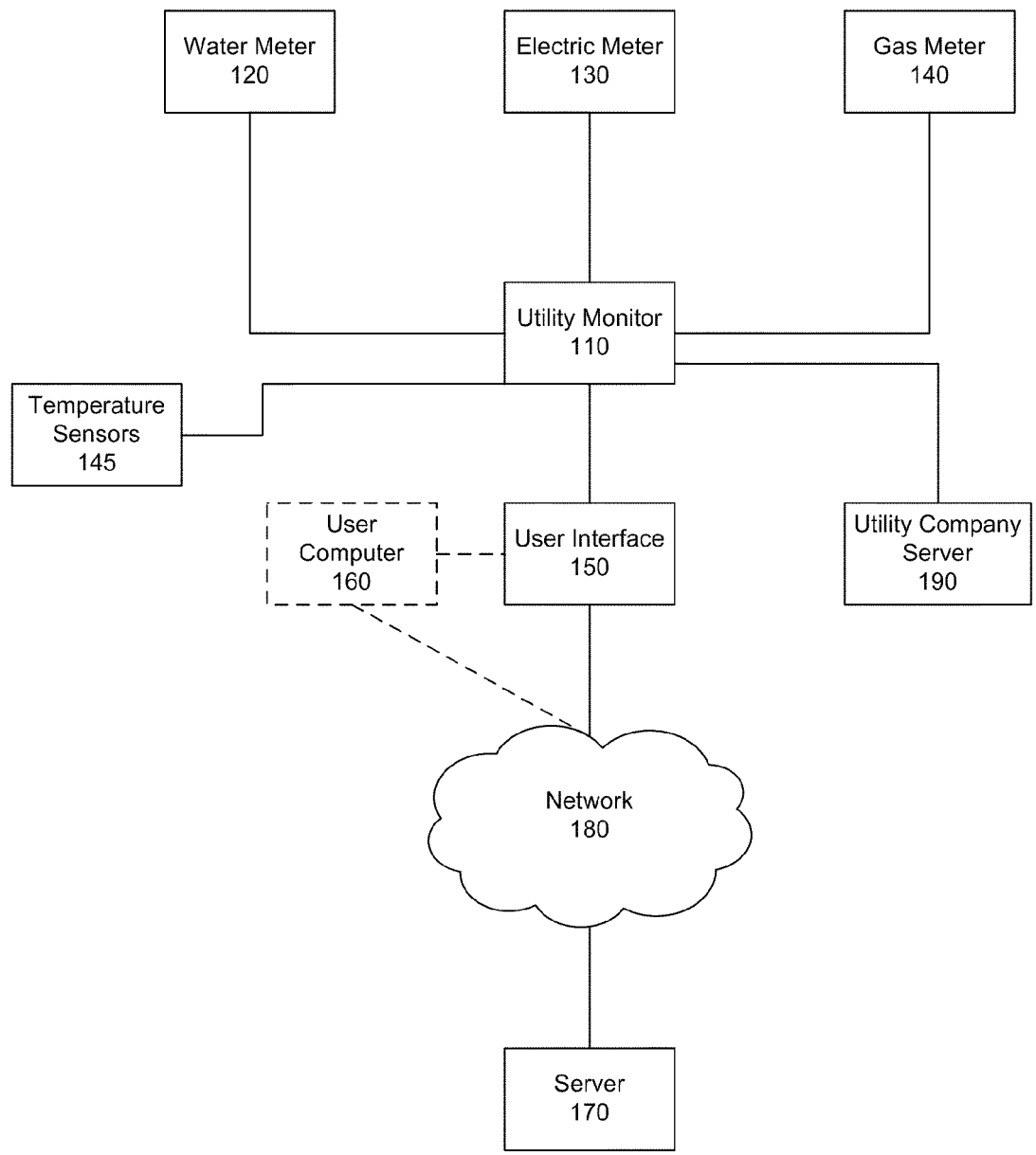
FIG. 1 is a schematic diagram of a disclosed utility monitoring system.

FIG. 1 illustrates, generally, a disclosed utility monitoring system 100. The utility monitoring system 100 includes a utility monitor 110 in communication with various utility meters 120, 130, 140. As used herein, "meter" refers to a device that can track consumption or use of a particular quantity. For example, an electrical meter that tracks electricity consumption can be a meter installed by a power company or another metering device, such as a supplemental electrical meter (not shown) installed in a circuit breaker panel.

The utility monitor 110 can be, or include, a multiplexer, analog to digital converter, digital signal processor, or power line interface device. In FIG. 1, the utility meters 120, 130, 140 are, respectively, a water meter, an electric meter, and a gas meter. However, the monitoring system 100 need not include all of the meters 120, 130, 140. In particular implementations, the monitoring system 100 includes additional meters, such as, for example, a heating oil meter (not shown). The monitoring system 100 can include additional monitors or sensors, such as temperature sensors 145 or other ambient sensors (such as humidity, or pressure sensors).

The utility monitor 110 is in communication with a user interface 150. The user interface 150 may optionally be in communication with a user computer 160. The user interface 150 can be connected to the user computer 160 by, for example, USB, serial, parallel, SCSI, RS232, SPI, I2C, Ethernet, wireless protocol, power line communications (such as the Homeplug standard), ZigBee, or PS/2 connections. In some implementations, the user interface 150 is a stand alone component and need not be connected to the user computer 160. In further implementations, the user interface 150, or user computer 160, is in communication with a remote server 170 over a network 180, such as the internet. In some implementations, the utility monitor 110 is integrated into the user interface 150 or the user computer 160. In yet further implementations, the utility monitor 110 is omitted and the meters 120, 130, 140 communicate directly with the user interface 150 or the user computer 160. Some embodiments omit the user interface 150. The utility monitor 110 optionally communicates with utility providers 190.

In some configurations, the utility meters 120, 130, 140 are directly connected to the user interface 150, or user computer 160, such as through a wired connection, including standard communication protocols and adapters such as RS-232, Ethernet, serial, parallel port, SPI, SCSI, I2C, ZigBee, and USB connections. In a particular example, the utility meters 120, 130, 140 send signals to the user interface 150 over power lines, such as using a power line modem. In a more particular example, the components of the system 100 communicate using the Homeplug communication standard. In further implementations, the utility meters 120, 130, 140 generate wireless signals that are receivable by a receiver (not shown) of the user interface 150 or the user computer 160. In some implementations, the user computer 160 accesses the user interface 150 through a web browser. For example, the user interface 150 may be assigned an internet protocol (IP) address. In particular examples, the user interface 150 communicates with the user computer 160, remote system 170, or network 180 using the TCP/IP protocol.

Figure 2:
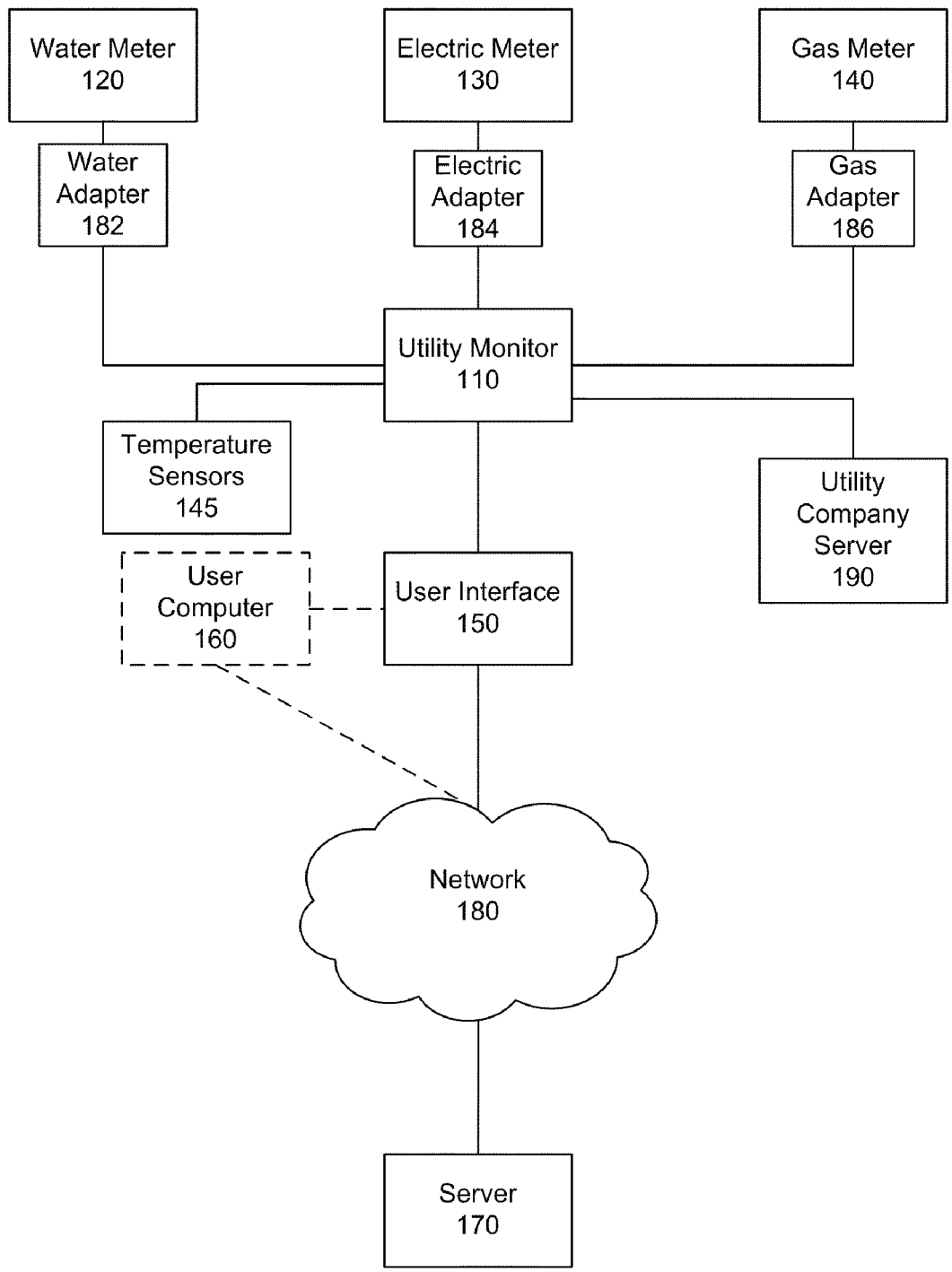
FIG. 2 is a schematic diagram of a particular implementation of the utility monitoring system of FIG. 1.

In particular embodiments, such as the system 200 illustrated in FIG. 2, the utility monitor 110 is connected to the utility meters 120, 130, 140 through respective adapters 182, 184, 186. In particular examples, the adapters 182, 184, 186 are designed to facilitate installation of the monitoring system 100.

In some aspects, the adapters 182, 184, 186 are designed to be installed by a consumer or other end user. In other aspects, one or more of the adapters 182, 184, 186 are designed to be installed by a professional, such as an electrician or plumber. The adapters (or sensors) 182, 184, 186 may be powered by the local electrical supply (not shown), or may have a portable power supply (not shown), such as a battery. In particular examples, the portable power supply includes a solar cell, which may be used to power the adapter 182, 184, 186 or charge its batteries. Suitable adapters 182, 184, 186 are the Meter Interface Units (MIUs) available from Archnet of ShenZhen, China. In some implementations, the electrical adapter 184 or electricity meter 130 includes an in line shunt resistor, a current transducer, or a Hall Effect sensor. Suitable Hall Effect sensors are available from GMW Associates of San Carlos, Calif., such as the Sentron CSA-1V.

In particular implementations, the adapters 182, 184, 186, such as the adapter 182 for the water meter 120, include a photo sensor, such as an infrared or optical sensor, that detects rotation of a dial mechanism. In one example, the sensor detects reflection of light off of the dial mechanism.

A light source, such as an optical or infrared LED, is included, in certain embodiments, to generate a signal to be measured. An integrated light emitting diode and photodiode is available from Honeywell (PN# HOA1180). A marker, such as a piece of more highly light absorbing or reflecting material, may be placed on the dial in order to help track rotation of the dial.

In further examples, a separate meter, such as a flow meter, is installed in the gas line or water line. A separate meter may also be included on the electrical line, such as a voltage or current meter. In particular implementations, the electrical adapter 184 is installed between an electrical socket and an existing electrical meter, such as an electrical meter installed by a power company. Suitable socket adapters 184 are available from RIOTronics, Inc. of Englewood, Colo. In some implementations, the adapters 182, 184, 186 read signals, such as wireless signals, generated by an existing meter, such as a meter installed by a utility company.

In some implementations, the electrical adapter 184, or multiple electrical adapters 184, is connected to one or more individual circuits entering a measurement site. Each circuit may have a separate adapter 184, such as an electric metering device, or multiple circuits may be individually monitored by a single electrical adapter 184. In particular examples, the electrical adapter 184 includes a current transducer (not shown) attached to the wires corresponding to each breaker switch in a circuit box. A multi-channel analog to digital voltage sensor (not shown) may be in communication with the current transducer to simultaneously monitor multiple circuits.

The user interface 150 collects data from utility monitor 110. In some implementations, the user interface 150 contains a processor and software or firmware for processing the collected data. The data or processed data can be transferred from the user interface 150 to the user computer 160. In particular examples, the user interface 150 includes a display and user input device. The user can, in some examples, be presented with information or control the system 100 using the user interface device 150. In some implementations, the user interface is a device running the PALM operating system (available from Palm, Inc., of Sunnyvale, Calif.), Embedded Linux (available from uClinux at www.uclinux.org) or the Windows Mobile (Pocket PC) operating system (available from Microsoft, Inc., of Redmond, Wash.).

In embodiments where the user interface 150 transfers collected data to the user computer 160, or the utility meters 120, 130, 140 are directly connected to the user computer 160, suitable data processing software is installed on the user computer 160. In yet further implementations, the user interface 150, or user computer 160, is in communication with the remote server 170. The remote server 170 processes the collected data and displays summary information, reports, or other information to a user on the user interface 150 or user computer 160.

The consumption of a utility by a load, such as the use of an appliance, is associated with the consumption of one or more utilities, such as one or more of water, electricity, gas, propane, coal, hydrogen, and heating oil consumption. In embodiments where electricity adapters 184, such as current transducers, are mounted on individual breaker switches, the overall system 200 has additional information to associate with an electrical load. Data from one or more meters 120, 130, 140, adapters 182, 184, 186, or ambient sensors 145 may be used to identify a particular utility load.

Figure 3:
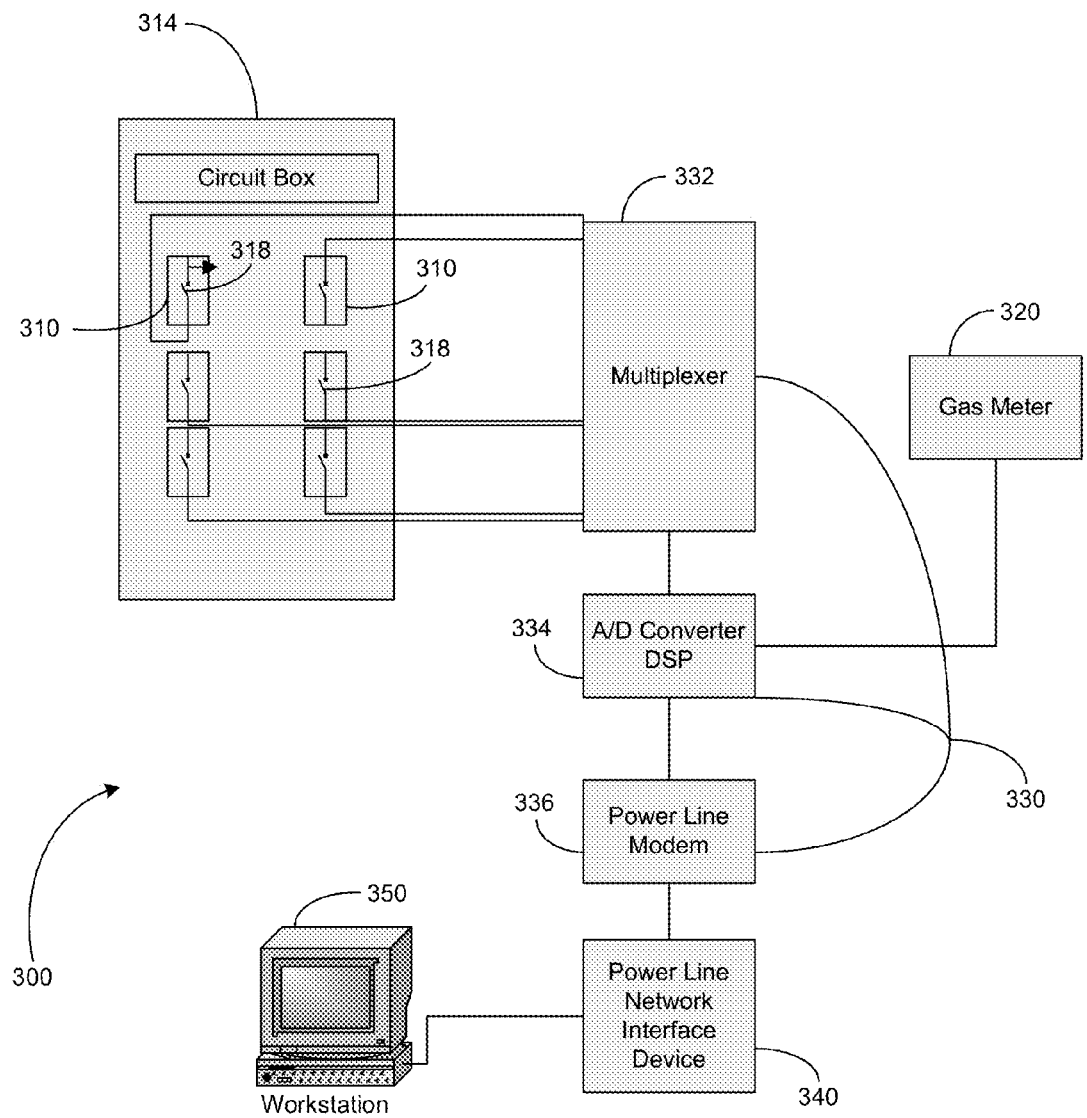
FIG. 3 is a schematic diagram of an implementation of the utility monitoring system of FIG. 1 capable of monitoring a plurality of individual electrical circuits.

FIG. 3 illustrates another architecture for a utility monitoring system 300. The monitoring system 300 includes an electricity meter adapter 310 installed at each circuit 318 in a circuit breaker panel 314. In particular implementations, each adapter 310 monitors multiple individual circuits 318. The monitoring system 300 also includes a gas meter 320. The gas meter 320 may be implemented as described in conjunction with systems 100 or 200. In further embodiments, the gas meter 320 is omitted or additional meters, such as water or heating oil meters, are included in the system 300.

The gas meter 320 and electricity adapters 310 are in communication with a controller 330. The controller 330 includes a multiplexer 332, an analog to digital converter and digital signal processor 334, and a power line interface device 336, such as a power line modem. The controller 330 is in communication with a power line network interface device 340 which, in turn, is in communication with a user computer 350.

Powerline network integrated circuits are available from Intellon (PN#INT5200) of Ocala, Fla.

In particular examples, the controller 330 is a Blackfin Digital Signal Processor (DSP), available from Analog Devices, Inc., of Norwood, Mass. This particular DSP has built in network connectivity and an SPI interface (serial peripheral interface). In particular implementations, this controller 330 is programmed using DSP++ (Analog Devices, Inc.) or LabView (available from National Instruments, Inc., of Austin, Tex.). The analog to digital converter 334 may be a 16-bit converter connected via the SPI. The multiplexer 332 may, in particular examples, acquire data from up to 32 channels.

Load Identification

Various types of information contained in the collected data can be used to identify a particular load. For example measurements can be made of: the time the consumption began; the duration of the consumption; the rate of consumption; the total amount of utility consumed during a particular period; the maximum or peak use; the shape and magnitude of the electrical power waveform (such as the 60 Hz waveform); and any changes in the rate of consumption. These measurements can be compared to a library of standard values for different types of loads. The measurements can also be compared to a library of appliances previously observed on the utility signal. As an example of how consumption can be used to identify a load, a toilet flush can be distinguished from a shower based on the duration of the consumption, the total amount of water consumed, and the water flow rate.

Time of day information can sometimes assist in identifying a load. For example water usage in the middle of the night is more likely to be due to a toilet flush than a shower. Repetitive periodic water usage throughout the day might be due to a sprinkler system whereas repetitive periodic water usage thought the day and night might be due to an ice maker. Even if the consumption patterns are not sufficient to completely identify the loads, they can still be used to help select the most likely candidates. The user can assist the appliance identification program by linking an unidentified appliance to the name of an appliance that is known have been in operation.

When the data is electrical data, additional information may be measured and used to identify a load. For example, the shape and size of the 60 Hz conductance waveform (defined as the current divided by the voltage) may be used to help identify the load. Typical resistive appliances, such as incandescent lights and clothes irons, draw current that is in phase with the AC voltage. Appliances with a reactive and resistive load (such as a DC transformer for a stereo amplifier and a motor on a clothes washer) draw current that is out of phase with the voltage. Yet other appliances, such as computers, have switching power supplies that consume power for brief intervals during a voltage cycle. Analysis of the amplitude and temporal variation of the current and power waveforms can help identify specific loads connected to a circuit. The circuit can be characterized by its voltage and current measured at a particular sampling rate, such as 3840 Hz to provide 64 samples per voltage cycle.

For some loads, the current or voltage may be very stable. For example, certain light bulbs are either on or off. Other loads may operate at discrete values, such as a ceiling fan with 3 speeds. Further types of loads will have a range of settings, such as a power drill having variable speed control. Finally, other loads (such as a refrigerator, TV, or computer) may have more complex combinations of conductance over time.

Signal processing techniques can be used to disaggregate a bulk signal, such as the total household electrical or water use data, into its component loads based on the unique properties of each load. A library of properties of common loads can be maintained and accessed by the user interface 150, user computer 160, or remote system 170. For example, the library can include properties of appliances from model years that are most likely to be used in the monitored environment.

When located on the user interface 150 or user computer 160, this library can be updated periodically, such as through the internet 180 by the remote server 170. Other programming of the user interface 150, or software running on the user computer 160, can also be updated via the internet, such as with improved algorithms, heuristics, and the like. In certain implementations, training or other user provided data is used to update a library that can be shared with other users. With a broad set of load profiles, the systems 100, 200, 300 will be able to, in particular examples, automatically identify the loads consuming at least about 90% of the utilities in the monitored area.

In some aspects, the systems 100, 200, 300 use a processing algorithm that employs statistical analysis, such as a least squares fit, to identify individual loads. In a specific example, an effective variance analysis is performed on changes in conductance. Conductance is a useful parameter to characterize the power consumption behavior of an appliance since it is: (1) voltage independent (i.e. an appliance's conductance changes minimally with normal fluctuations in voltage delivered to the circuit) and (2) is additive for the calculation of power (i.e. the conductance on a circuit is the sum of the conductances of all appliances).

In some examples, the voltage and current waveform is sampled at a sufficient rate such that many data points are collected for each voltage period. When the AC voltage V passes from negative to positive, current I and voltage V data points are each inserted into the first columns of a two dimensional array. The number of rows in the array is defined by the number of samples taken during a voltage cycle. When the AC voltage V passes from negative to positive again, the current and voltage data are inserted into the next columns of the arrays and so forth. With this data, instantaneous values of the Power P (I*V) measured in Watts and Conductance G (I/V) measured in Siemens can be calculated. In particular examples, the average and standard deviation of the rows of the conductance array is calculated on a one second basis.

The current and voltage waveforms are measured as:

$$I = I_1, I_2, \ldots I_n$$

$$V = V_1, V_2, \ldots V_n$$

Where n is the number of samples measured during each voltage cycle. Similarly, the conductance of each sample is also calculated:

$$G = \frac{I_1}{V_1}, \frac{I_2}{V_2}, \ldots \frac{I_n}{V_n}$$

The average and standard deviation of each element of I, V, and G is calculated for each non-transient (non-event) period by averaging over all voltage cycle waveforms over a period for example 1 second. To minimize memory needs for the system, the point-by-point calculations are used to calculate the mean and standard deviations. This is accomplished by tracking the number of measurements, the sum of the sample measurements, and the sum of squares of the sample measurements. The mean is calculated by the equation:

$$\mu_m = \frac{x_m + \sum_{j=1}^{m-1} x_i}{m}$$

The standard deviation is subsequently calculated using the following equation:

$$\sigma_m = \sqrt{\frac{x_m^2 + \sum_{j=1}^{m-1} x_i^2}{m} - \mu_m^2}$$

Figure 4:
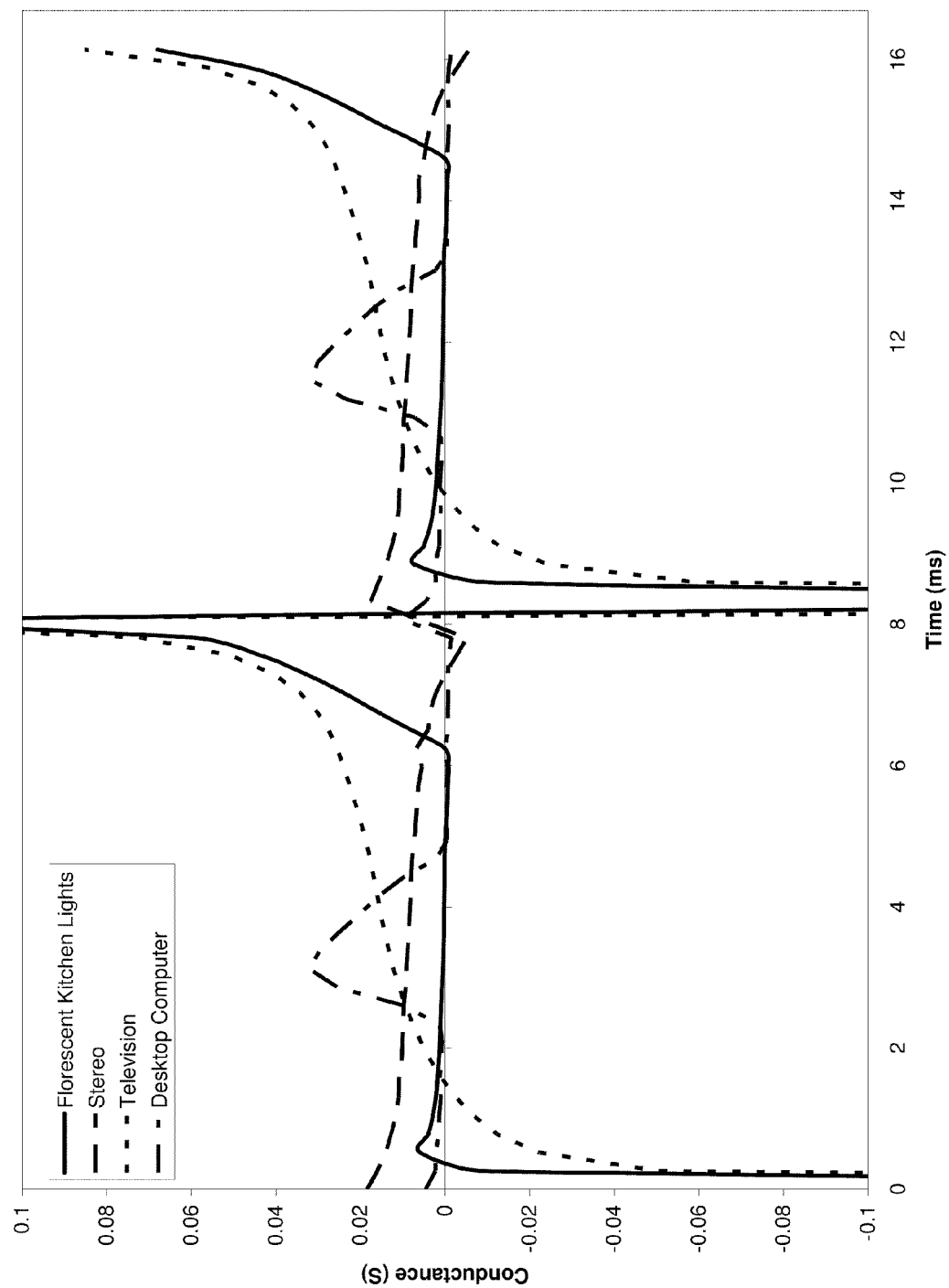
FIG. 4 is a graph of the average conductance waveforms for four appliances.

In this case, the variable x is the waveform of conductance over the $j^{th}$ voltage cycle. An example of conductance waveforms for four appliances is shown in FIG. 4. In this example, the data were collected with a 13-bit digital to analog converter with an electrical current sensitivity of 16 mA per bit. The Figure shows substantial variation of the conductance waveforms for the different appliances.

The states of appliances on a particular circuit are identified by applying an effective variance calculation using all combinations of appliance waveforms known to exist on that particular circuit.

The effective variance method seeks to find the minimum of the following equation:

$$\chi^2 = \sum_{i=1}^{n} \frac{\left(G_i - \sum_{k=1}^{p} a_{i,k} S_k\right)^2}{\sigma_{G_i}^2 + \sum_{k=1}^{p} \sigma_{a_{i,k}}^2 S_k^2}$$

Where $\chi^2$ is the cost function to minimize, i is the element within a voltage cycle period, n is the number of elements within one period, k is a particular appliances out of a total of p known appliances within the appliance library, $a_{i,k}$ is the $i^{th}$ element of the conductance array of appliance k, $S_k$ is the binary state of appliance k (1=on, 0=off), and a is the standard deviation of the $i^{th}$ element of either G or a.

A transition event is defined to begin when the running $x^2$ (comparing the interval from one period to the same sized interval in the next period) exceeds a certain threshold, indicating a change in the operational state of one or more appliances connected to the circuit. The transition event is defined to end when the running $\chi^2$ falls below a predetermined threshold. Typical applications use an interval of 1 second for the running $\chi^2$ calculation. All combinations of $S_k$ are tested to find the minimum $\chi^2$. If the minimum $\chi^2$ is above a certain threshold, a new device is added to the appliance library.

For a total of p appliances, there are $2^p$ different combinations of S. Since devices are generally turned on one at a time, S usually changes only one element at a time and the search for the optimal S can begin with p different combinations of S thereby reducing the number of calculations needed to find S. When looking at power increases, the number of combinations to be analyzed can be further reduced by omitting devices that are already on as possible candidates. Similarly, when looking at power reductions, devices that were not previously on can be omitted in determining possible candidates. In these situations, the number of combinations is less than p.

For appliances that are continuously variable (i.e. a light with a dimmer), the different states will initially be identified as different appliances. As the user trains the appliance identification algorithm, the algorithm will identify the appliance based on the interpolation of already measured appliance states.

The disaggregation algorithm is configured, in some embodiments, to identify small loads that are turned on while a much larger load is active. Failure to achieve this separation can cause the load identification techniques to inaccurately group various appliances and produce erroneous results. The following example demonstrates the ability of the effective variance technique to determine the operational state of an 18 W reading lamp while a 2100 W air conditioner is turned on.

Figure 5:
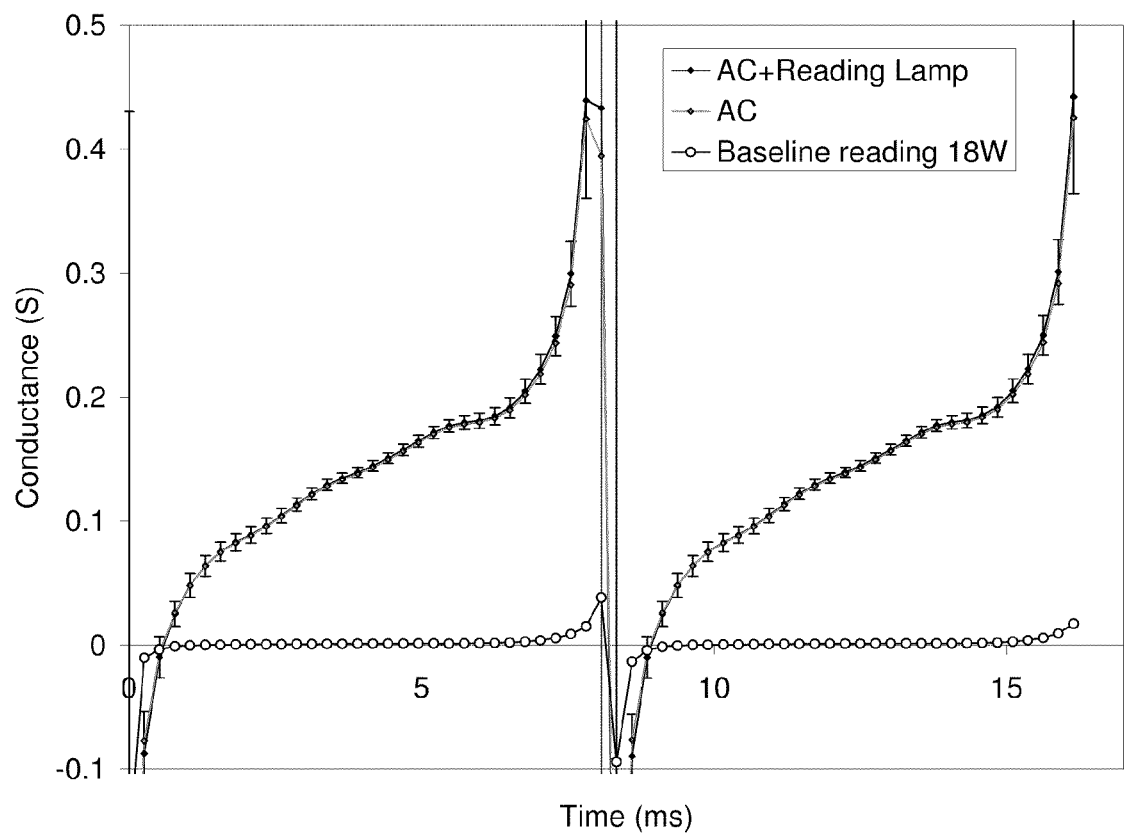
FIG. 5 is a graph of the average conductance waveforms of an air conditioner (2100 W) and a reading lamp (18 W).

A comparison of the conductance profiles are shown in FIG. 5. The error bars in the chart indicate that the variability of the conductance samples of the combination of both reading lamp plus air conditioner spans the conductance samples of the air conditioner alone.

A stochastic analysis was performed by simulating waveforms assuming each $i^{th}$ measurement of conductance is normally distributed about its mean. A random number generator was used to add error to each average value to simulate the variation of repeated measurements. The uncertainty of the average sample value (i.e. the standard error) decreases as the number of samples increases and is defined as the standard deviation divided by the square root of the number of samples. Based on this relationship, the average conductance waveforms for a variety of averaging periods ranging from 0.0167 seconds (one voltage cycle) up to 30 seconds were simulated.

The $\chi^2$ was calculated for each sample point in the waveforms by comparing one simulation of the air conditioner conductance (i.e. the test set) with another simulation of the air conditioner conductance ("case one"). The standard deviations of each conductance measurement were used in calculating the $\chi^2$. This calculation was repeated for the conductance waveform of the test set comparing it with the conductance of the air conditioner plus the reading lamp ("case two").

Figure 6:
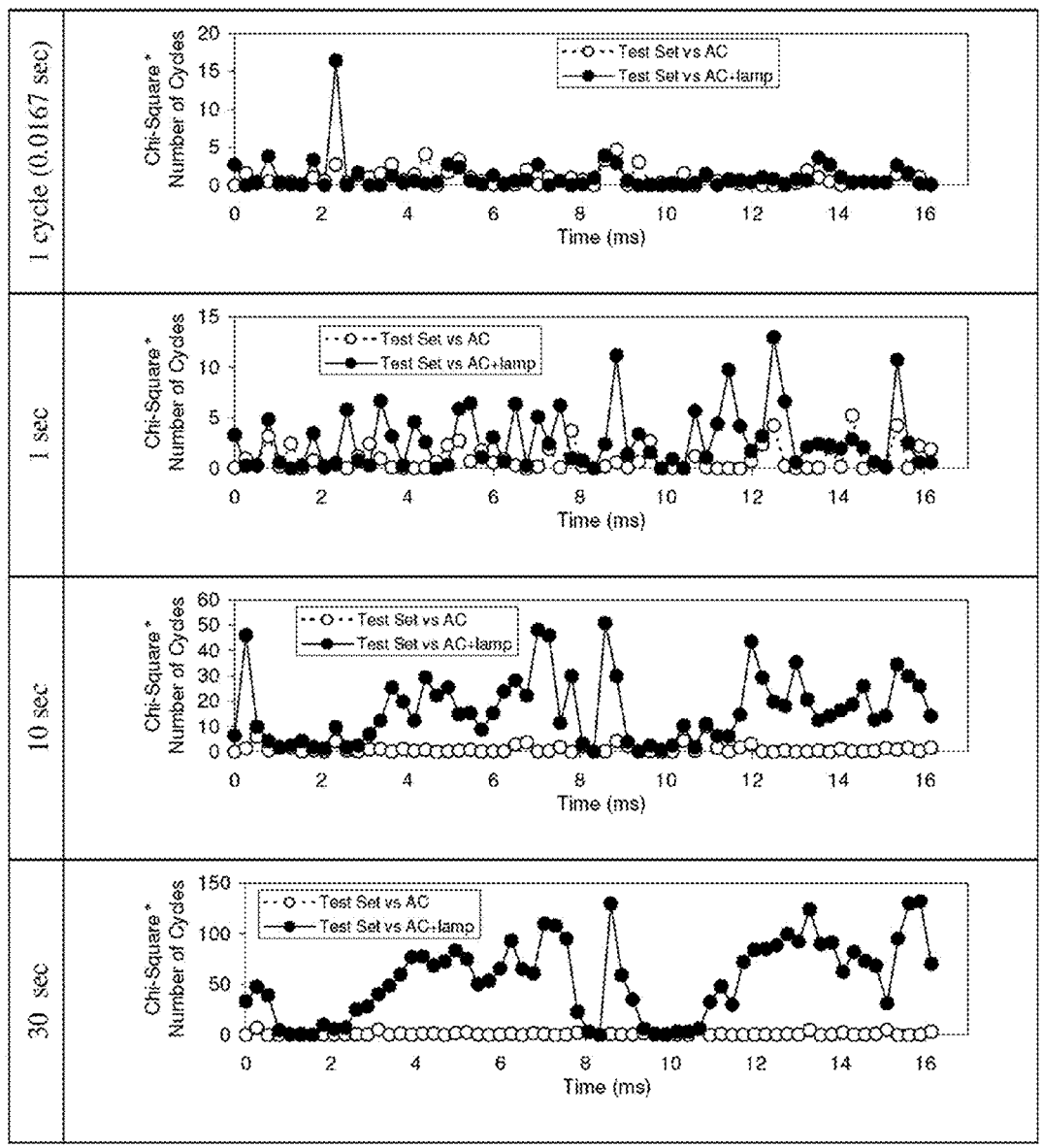
FIG. 6 is a series of graphs showing chi-square calculations of the conductance waveforms of an air conditioner versus the air conditioner plus a reading lamp, and of an air conditioner versus itself.

The top panel of FIG. 6 shows the $\chi^2$ values calculated for only one voltage cycle. It can be seen that these are indistinguishable, indicating that when averaging for one voltage period (0.0167 seconds), the operational state of the lamp can not be determined when the air conditioner is on. As averaging periods increase the average $\chi^2$ times the number of waveforms sampled increases for case two, whereas the values for case one remain constant.

Figure 7:
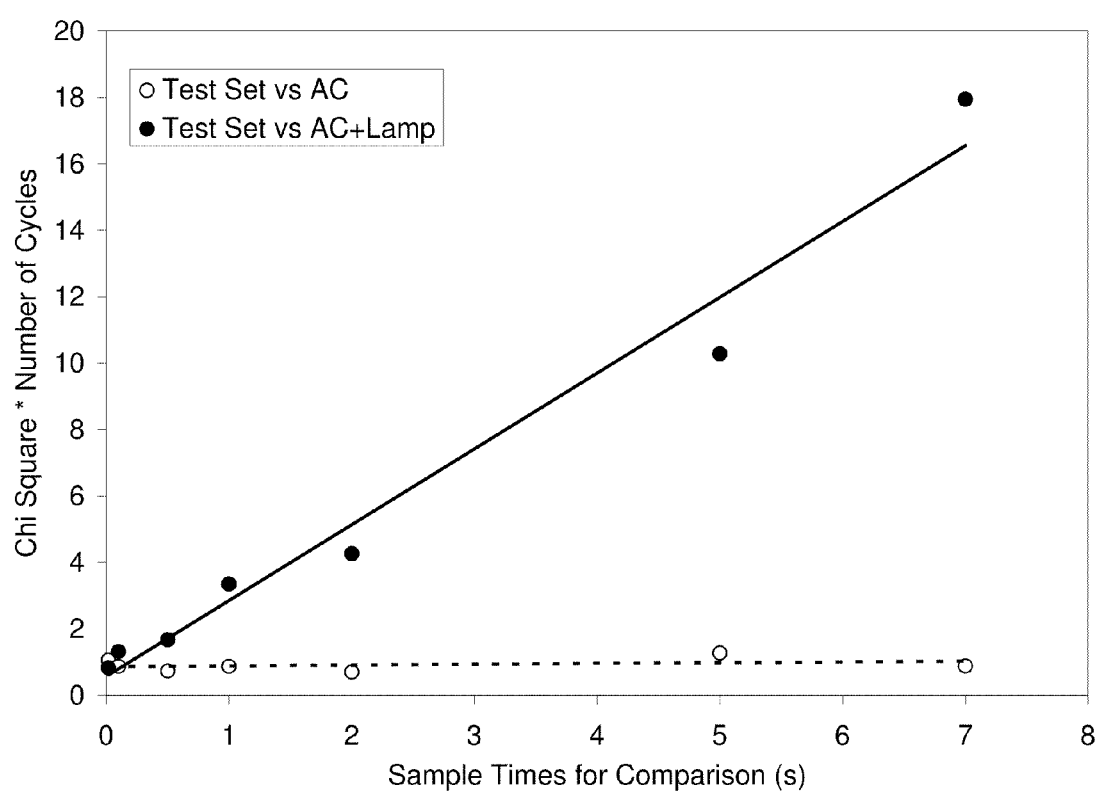
FIG. 7 is a graph of chi-square values versus averaging time.

FIG. 7 shows a comparison of the average $\chi^2$ values times the number of voltage cycles for a range of averaging periods. The load identification algorithm selects the combination of appliances with the lowest chi-square. This example shows that the operational state of the lamp can be determined while the air conditioning is on after approximately 1 second. This is a substantial improvement in appliance selectivity over existing methods that use only real and reactive power (and occasionally odd number harmonic components) to infer the operational state of appliances. Accordingly, the averaging period can be chosen to provide a desired level of load resolution.

The disclosed methods can also yield other useful information for power quality assurance such as THD (total harmonic distortion Eq. 4) and PF (power factor Eq. 5) which are useful for electric utilities and more informed users:

$$THD(\%) = 100 * \frac{I_{n=1}}{\sum\limits_{2}^{\infty} I_n} \%$$ Eq. 4

$$PF = \frac{\sum\limits_{n=1}^{\infty} V_n * I_n * \cos(\varphi_n - \phi_n)}{\sum\limits_{n=1}^{\infty} V_n * I_n}$$ Eq. 5 where n is the index of the fundamental frequency of the current I and voltage V. The term ($\phi$-ø) is the difference in phase angles between the current and voltage.

The THD and PF are typically monitored by electric utilities, and large power consumers often face penalties for violating established standards. The disclosed systems can be used to monitor these quantities and determine which loads have a detrimental effect on the power quality. Examples of data processing techniques that can be used or modified for use in electrical load analysis in the disclosed systems and methods are disclosed in Hart, "Nonintrusive Appliance Load Monitoring," *Proceedings of the IEEE* 80(12), 1870-1891 (December 1992), and U.S. Pat. No. 5,717,325, each of which is expressly incorporated by reference herein in its entirety (in the case of any inconsistency with the present disclosure, the present disclosure shall control).

In particular embodiments, the disaggregation algorithm uses time sequence heuristics based on likely or historical load use. Appliances are often used in a particular order. For example, a user's morning routine may be to take a shower, blow dry their hair, start a coffee maker, and make toast. In one aspect, the time a particular load consumes a utility can be used to help identify the load. For example, the aforementioned activities may typically occur in the morning. Accordingly, when discriminating between two possible loads to assign to a particular source of consumption, the time the load was activated may indicate assigning one load over another. Similarly, a particular sequence of loads may be indicated as more probable than another sequence. For example, "shower"—"hair dryer"—"coffee maker" may be indicated as more likely than "washing machine"—"hair dryer"—"coffee maker". Both time-based and sequence-based heuristics may be weighted such that heuristics that are more probably true are weighted more heavily than heuristics that are less probable.

In further embodiments, the disaggregation algorithm uses a combination of data from two or more utilities to identify a load. For example, certain appliances, such as a dishwasher, use multiple utilities. Appliances that use a combination of utilities can thus be distinguished from appliances that use fewer utilities. Analyzing data from multiple utilities can also be used to identify loads, even when the load only consumes one utility.

Figure 8:
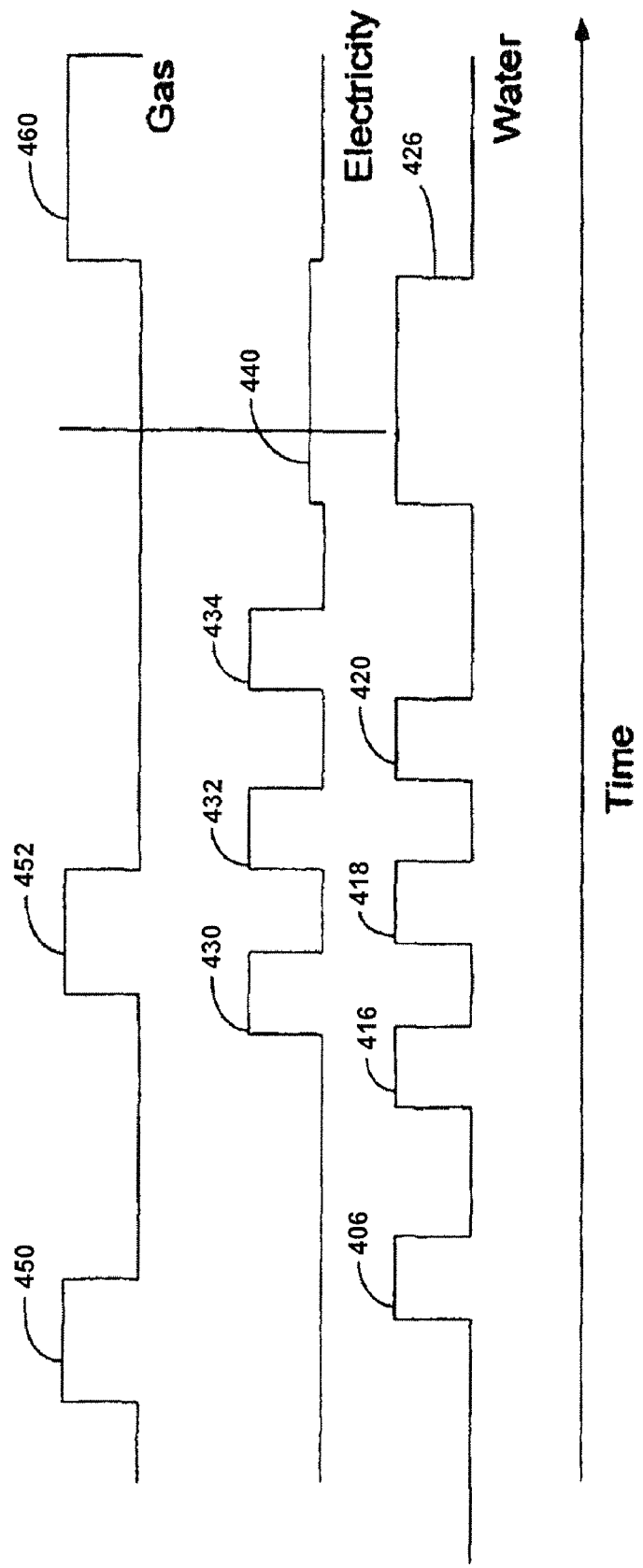
FIG. 8 is a graph of simulated utility data for an electricity meter, a gas meter, and a water meter illustrating how loads can be identified based on analyzing multiple utilities.

For example, FIG. 8 presents simulated utility data simultaneously obtained from a gas meter, an electric meter, and a water meter. During the observed time, the user flushed a toilet, ran a washing machine, and took a bath or a shower. In addition, the user's furnace was activated.

Looking at the water trace, area 406 represents the toilet flushing. Areas 416, 418, 420 represent wash and multiple rinse cycles of the washing machine. Area 426 represents the user's bath or shower. The toilet flush 406 can be distinguished from the shower 426 and washing machine cycles 416, 418, 420 based on the duration of the utility use and the pattern of use. For example, the washing machine pattern 416, 418, 420 may be a standard water use pattern for the particular washing machine model owned by the user. The toilet flush 406 may be identified because it uses a fixed amount of water per flush.

Areas 430, 432, 434 of the electricity trace represent wash and rinse motor cycles of the washing machine. Again, the areas 430, 432, 434 may be characteristic of the particular washing machine used. The identification of areas 416, 418, 420 and 430, 432, 434 as being due to the washing machine is further confirmed by the relation of water use to electricity use. The washing machine would be expected to use both electricity and water. Furthermore, the water and electricity use show a clear pattern of the washing machine filling with water, followed by activation of the washing machine motor.

The electricity trace also shows a longer, less intense period of electricity use at area 440. The area 440 may correspond to lighting used during the user's shower.

The gas trace shows heater use at areas 450, 452. Areas 450, 452 can be assigned to the heater based on the duration and magnitude of the heater use, as heating likely uses a consistent gas draw rate. Furthermore, areas 450, 452 do not correspond to any electricity or water consumption, further confirming that the gas use is due to a heater. Gas use area 460 is assigned to a gas hot water heater. This assignment can be based on the degree and duration of gas use, as well as the correlation with hot water use during the user's shower, as confirmed by the electricity use area 440 and the water use area 426.

Figure 9:
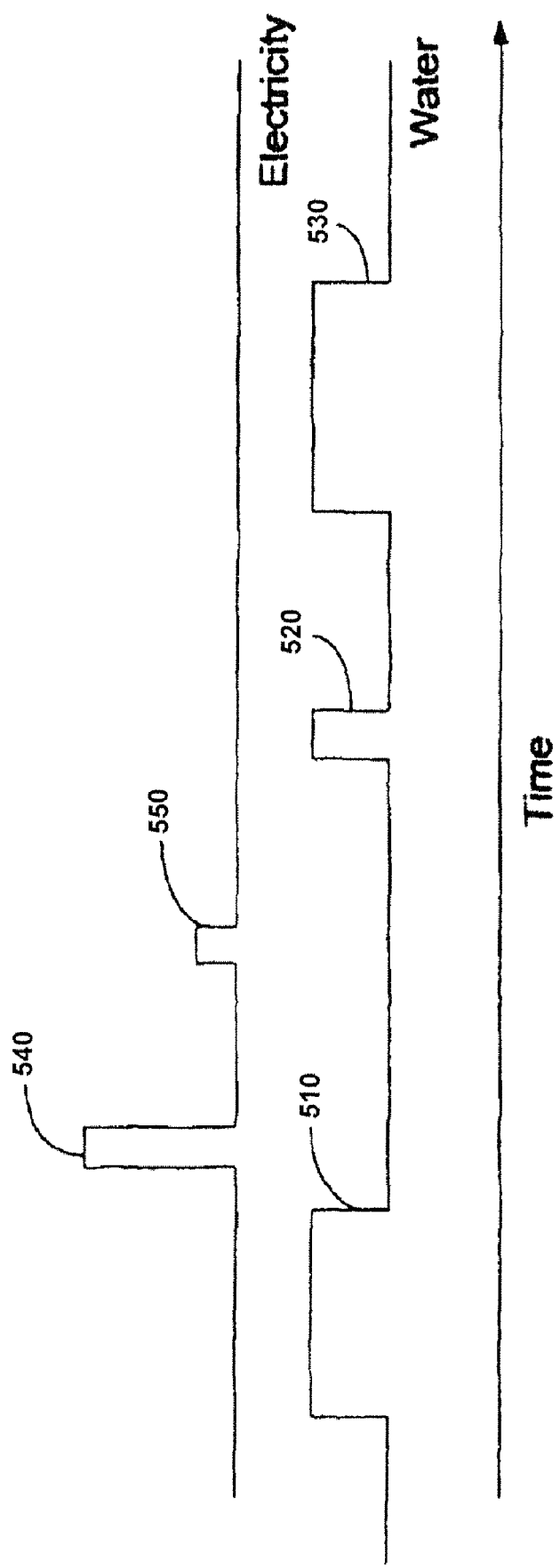
FIG. 9 is a graph of simulated utility data from an electricity meter and a water meter illustrating how sequence heuristics can be used to identify loads.

FIG. 9 presents electricity and water traces for simulated utility use. The water trace contains an area 510 associated with a morning shower. An area 520 represents a sink running and an area 530 represents activation of an automatic sprinkler system. The electricity trace exhibits an area 540 associated with the use of a hairdryer and an area 550 representing activation of a toaster.

The identification of the utility loads can made based on the time of day of the consumption, the correlation of different utility consumption, and sequence heuristics. For example, the relatively long, steady water consumption of area 510 is closely followed in time by the short, high electricity consumption area 540. The combination of these two events, as well as the time of day, helps confirm the assignment of these areas to a shower and hair dryer.

Similarly, without any other information, the area 550 might be difficult to assign to a toaster versus a number of other small wattage appliances. However, the time of day, occurrence after the shower 510, and before the running of the sink at area 520, helps establish area 550 as being due to a toaster as part of the user's morning routine. If the time of day indicated that the sun was up, this would indicate that area 550 was unlikely to be a lighting device. In case of conflict, such as the time of day indicating that it was dark outside, the multiple data streams can be compared and the most probable load chosen based on the heuristics most likely to produce the correct result. In case of error, the user can correct the system and help train the system to be more accurate in future predictions. The results can be presented with a particular confidence level to give the user an idea of the likely accuracy of the data.

For example, in certain implementations, a user can program the user interface 150, such as by adding or editing library entries or by training the user interface 150 with user input. For example, the systems 100, 200, 300 can include a handheld unit, such as a PALM based or Window Mobiles based computer. As an example, during a training session, the handheld unit displays a list of devices within the monitored area and the user indicates if the devices are on or off. In further embodiments, the handheld unit may specifically direct a user to turn a load on or off. With sufficient training, the systems 100, 200, 300 can identify when most of the major devices are on and how much of a particular utility each device is consuming. The user can then associate particular loads, behaviors, settings, and activities with specific costs.

Figure 10:
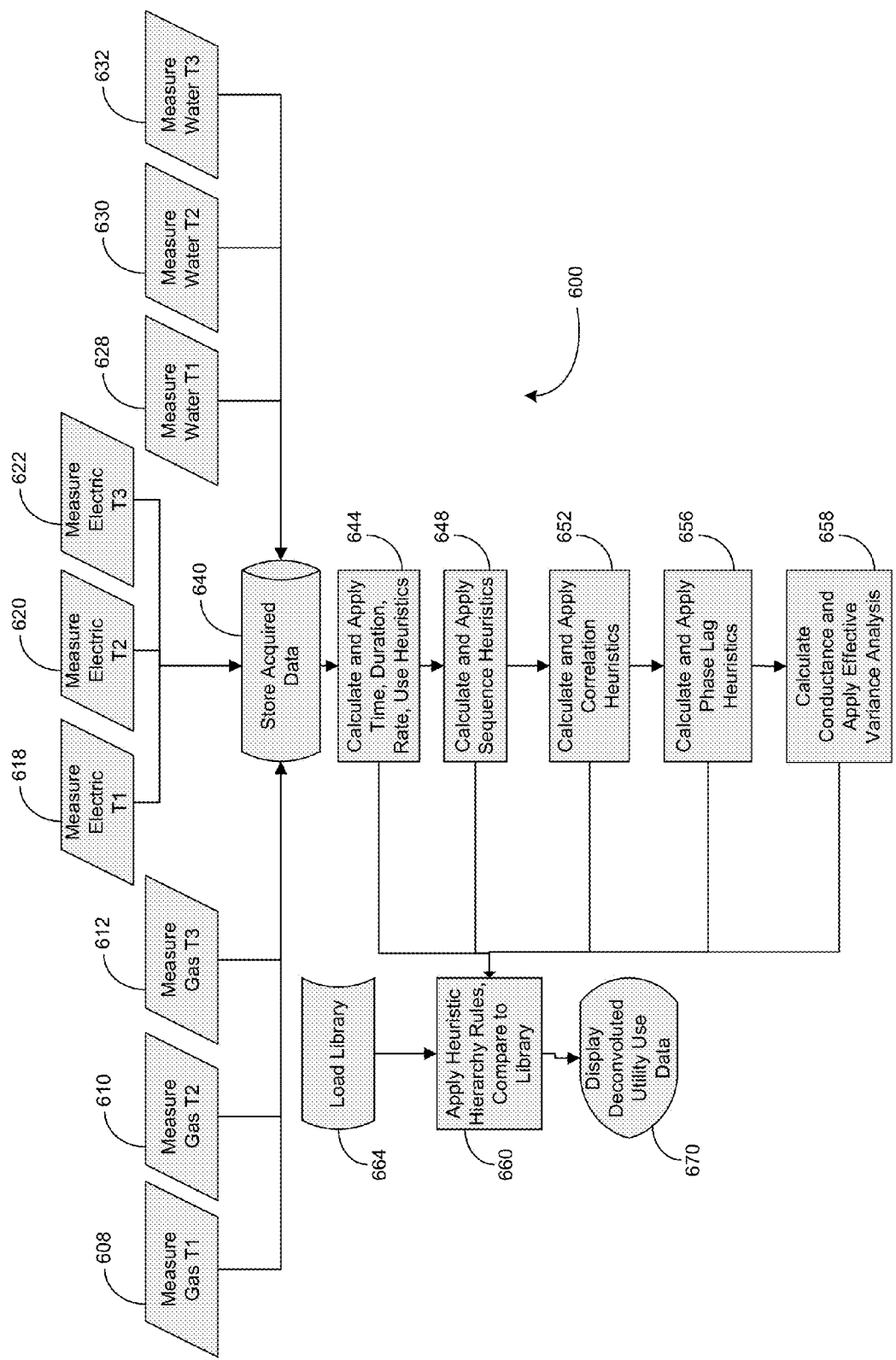
FIG. 10 is a process diagram illustrating how data obtained from water, gas, and electricity meters may be deconvoluted to provide consumption information for specific loads.

FIG. 10 presents a dataflow diagram of a process 600 of using the disclosed utility monitoring systems, such as the monitoring systems 100, 200, 300. Gas use is measured at a plurality of times at steps 608, 610, 612. Electricity use is measured at a plurality of times at steps 618, 620, 622. Water use is measured at a plurality of times at steps 628, 630, 632. Of course, the gas, electricity, and water use may be continuously monitored, with times 608, 610, 612, 618, 620, 622, 628, 630, 632 representing particular data points.

The acquired data is transmitted to, and stored in, a storage device in process 640. The storage device may be, for example, the user interface device 150, the user computer 160, or the remote server 170. The data is then processed, sequentially or in parallel, using various data analysis or disaggregation processes. For example, the rate of utility use, total amount of utility consumed, time of consumption, duration of consumption, and degree of consumption (such as the highest amount of the utility drawn) are analyzed in process 644. Process 648 analyzes the data using sequence based heuristics, as previously described. Process 652 analyzes the data using correlation based heuristics, as previously described. For example, process 652 may correlate water use to electricity or gas use. Process 656 may apply phase lag heuristics or analysis to the data. The above-described effective variance analysis of the conductance may be applied in process 658. The processes 644, 648, 652, 656, 658 may be applied multiple times, such as in an iterative process, in order to disaggregate the acquired data into utility use information for discrete loads in a monitored area.

A process 660 receives the results of the processes 644, 648, 652, 656, 658. In particular implementations, the process 660 applies further heuristics, or hierarchical rules regarding the processes 644, 648, 652, 656, 658 to select the most likely sources of utility use giving rise to the observed data. In further implementations, the process 660 consults a database 664 of utility loads in order to help identify discrete loads. The process 660 may send data back to one or more of the processes 644, 648, 652, 656, 658 for additional analysis.

Once the observed data has been disaggregated into utility consumption from discrete loads, the information may be presented to a user at process 670. For example, the information may be presented on the user interface 150 or user computer 160.

Methods of Using Utility Monitoring Systems

When the disclosed systems include water monitoring, the systems can be used to detect water leaks. For example, the system can be used to locate a leaky faucet, toilet, or sprinkler. In particular implementations, water consumption exceeding a certain duration, or exceeding a certain duration and particular rate, may indicate a leak or similar problem. In some implementations, the system provides a notification to the user, such as an alert when the user accesses the system, an email, page, or telephone call. In further implementations, the system may shut off the water, such as to prevent damage to the monitored area, or may automatically call a service provider. Similar measures may be implemented with other utilities, such as gas or electricity.

The system can also be in communication with, or otherwise monitored by, a utility company. In such implementations, the system can be used to enforce restrictions, such as watering restrictions. The system can prevent unauthorized use, or restrictions can be enforced, such as by issuing a fine, after data is reviewed by the utility. Similar measures can be implemented for gas or other utilities.

In certain aspects of the present disclosure, it is undesirable, unnecessary, or overly complicated to identify numerous individual small loads. Accordingly, loads can be grouped into a particular category. For example, rather than measuring the electricity use of multiple incandescent or fluorescent light bulbs, data can be collected or calculated for all such similar loads. Abnormally low or high sub-loads can generate a flag or alarm to indicate to the user that there may be an issue with a particular load category.

The user computer 160 receives data from the user interface 150 and can present a user with various reports. Such reports may be presented on the user interface 150, in particular examples. Such reports may include, for example, utility consumption summaries for a load, load category, or group of loads, such as a circuit. The consumption summary may be for a particular time period, such as a day, week, month, year, or period of years. Consumption over various periods of time can be used to track increased utility consumption over a time period. In further implementations, the user reports are provided to the user computer 160 over the network 180, such as from the remote server 170. In some configurations, the user interface device 150 provides the reports to the user, and may be in communication with the network 180 or remote server 170.

Consumption for a particular load can be compared, or benchmarked, against standard values. For example, a particular appliance may be associated with a standard data pattern. Comparison of the measured data with the standard data may be used to indicate the condition of the user's appliance, such as whether the appliance needs maintenance or should be replaced. The comparison may be used to help identify the type of maintenance or repair needed. For example, increased fan effort over time may indicate a clogged air filter in a furnace or air conditioning unit.

In further aspects, the user's consumption data is compared to similar users, such as users in the same zipcode, who have similar loads, or who have similar monitored areas. Such a comparison may allow a user to determine if they are consuming more utilities, or producing more pollution, than other similarly situated users. Such data can enable changes in user behavior, such as consuming less utilities or installing more efficient loads.

Figure 11:
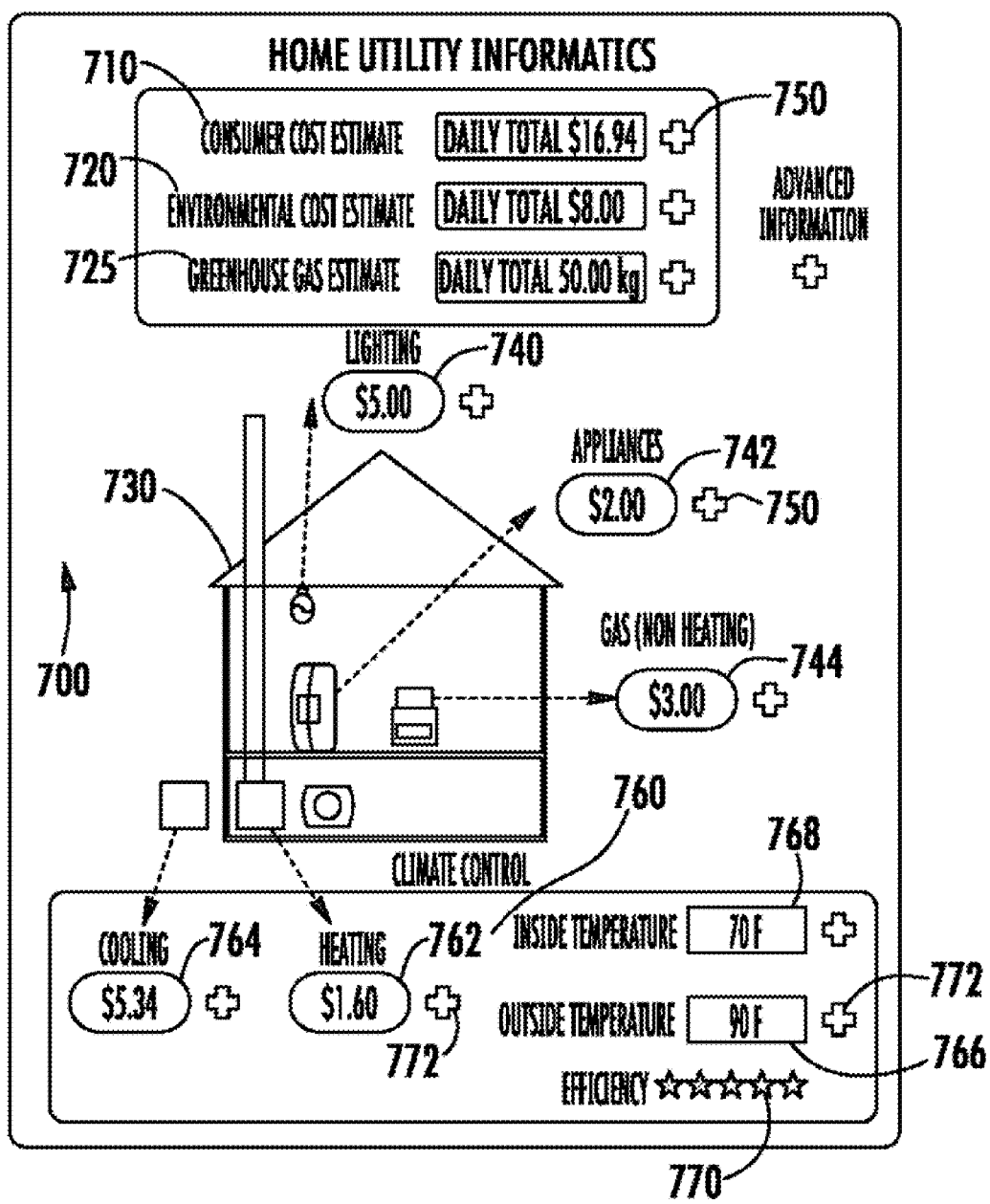
FIG. 11 is a sample user interface screen that may be displayed on a user's computer or the user interface by the utility monitoring system of FIG. 1.

FIG. 11 illustrates an embodiment of a user interface screen 700 that can be displayed on the user interface device 150 or user computer 160. The screen 700 presents the total cost of consumed utilities 710 and the abatement cost 720 associated with pollution caused by the utility consumption 710 and estimated green house gas emissions 725. A picture 730 of the monitored area is presented and the consumed utilities 710 are broken down by type, such as lighting 740, appliances 742, and gas 744. The user can get more information on each of these utility subcomponents, such as a detailed report for each associated load, by activating an appropriate link 750.

The screen 700 also presents climate control information 760, including heating costs 762, cooling costs 764, the temperature 766 outside the monitored area, and the temperature 768 within the monitored area. The screen 700 also rates the efficiency of the climate control system, such as using a star rating system 770. A user may choose to see more detailed information regarding each climate control component by selecting an appropriate link 772.

In another aspect, the data from the system may be used to benchmark the efficiency of the heating, ventilation, air conditioning, and insulation of a building, collectively referred to as the "thermal efficiency." When configured to measure electric power and natural gas (or heating oil) consumption, the device can attribute specific costs to the HVAC system. Users can benchmark their building's thermal efficiency by calculating a U factor based on the following equations:

$$U_{Heating} = \frac{\text{Heating Energy} + \text{Ventilation Energy}}{\text{Building Area} \cdot (\text{Inside Temperature} - \text{Outside Temperature})}$$

$$U_{Cooling} = \frac{\text{Cooling Energy} + \text{Ventilation Energy}}{\text{Building Area} \cdot (\text{Outside Temperature} - \text{Inside Temperature})}$$

This feature is useful for comparing the efficiencies of different buildings and deciding how to invest in HVAC and/or insulation upgrades. Such information can affect building purchasing decisions.

In a further aspect, the consumption for a particular load can be used to help the user determine whether the user should purchase a new appliance. For example, based on use history, as well as projections based on such historical consumption, the projected cost of a new appliance can be calculated and compared to the projected cost of continuing to use the existing appliance. If a significant amount of utility consumption can be avoided, the user may decide to purchase a newer or more efficient appliance. In particular examples, the systems 100, 200, 300 are used to determine whether, for example, a gas or electric appliance, such as a water heater, oven, range, clothes drying, or furnace, will be more cost effective.

The systems 100, 200, 300 may also be used to help a user to decide whether to take steps to make the monitored area more energy efficient. In particular examples, the systems 100, 200, 300 can estimate the energy savings that may be achieved through various measures, such as the installation of insulation, installation of energy efficient windows, or repair of leaky air ducts.

The disclosed systems, particularly those linked to a remote server 170, may be used to present the user with offers from merchants or service technicians. For example, a company may advertise a new, more efficient refrigerator to a user through the system. In particular examples, the user's data is shared with such merchants and technicians so that the advertisements or solicitations are tailored to the user. For example, a user whose data indicates an appliance is in need of repair may receive advertisements from a service technician in the user's area. In particular aspects, the user may choose to subscribe to a service plan and a service technician may automatically be dispatched when the system indicates a load is in need of repair. In particular examples, a user can choose whether to receive such solicitation, or whether to share their data.

In certain aspects, the systems 100, 200, 300 are used to control or set load use based on the user's cost preferences. For example, the system 100 can provide a thermostat setting that will yield a particular monthly energy cost. The user may also be presented with a range of temperature options and their associated costs. The user may manually set or program the thermostat. In further examples, the systems 100, 200, 300 are in communication with the thermostat and automatically control the thermostat in accordance with a user's energy or cost preferences.

In some implementations, the thermostat is capable of variably heating or cooling different sub-areas of a monitored site, such as different rooms in a house or hotel. In one example, a user can manually set different heating or cooling programs for the sub-areas. In another example, the systems 100, 200, 300 automatically adjust utility use based on programmed conditions. For example, an absence of utility consumption in a particular room may indicate that it is unoccupied. Accordingly, the systems 100, 200, 300 may adjust the heating or cooling to that room to use less energy. If utility consumption subsequently indicates the room is occupied, the systems 100, 200, 300 appropriately adjust the heating or cooling to the room.

The systems 100, 200, 300, in further embodiments, function as a security system. Unexpected patterns of utility consumption can indicate energy siphoning or unauthorized access from or to the monitored area. For example, a user can indicate that he or she is going on vacation so that the system 100, 200, 300 expects minimal energy consumption. In some examples, energy consumption above the minimal level triggers an alarm or notifies law enforcement authorities, or a security company.

In certain aspects, the present disclosure is used to schedule utility use based on variable rates. For example, a utility may be priced lower at off-peak hours. A user may program the system to activate or change utility consumption based on such rate data. In a particular implementation, the system automatically switches utility consumption, when possible or according to a program, such as a user defined program, to off-peak times.

Some embodiments of the present disclosure allow a user to monitor, and attempt to mitigate, their utility consumption and its associated environmental consequences. For example, the system may display both the actual utility cost of the user's behavior and the predicted environmental cost of their behavior. For example, the user may be presented with the monetary cost required to abate the environmental damage associated with their utility consumption. Even if the user is not concerned by the cost of their utility consumption, they may wish to mitigate environmental damage. The system may present the user with options to both reduce their utility consumption and ways to reduce the environmental consequences of their actions. In certain situations, a user may wish to pay more for some utilities in order to reduce the environmental consequences of their actions.

Although the present disclosure generally describes apparatus, systems, and methods for monitoring utility consumption, the present disclosure may also be applied to utility generation. For example, a monitored area may receive supplemental electrical power from solar cells. The systems 100, 200, 300 are, in certain implementations, configured to regulate power drawn from the supplemental source and the main source, such as drawing power from the main source to make up for any shortfall in the amount generated by the supplemental source. In further implementations, the systems 100, 200, 300 measure an amount of power generated by the supplemental source and transferred to a main power grid, as a user may receive payment for such generated power.

The systems and methods of the present disclosure can provide a number of advantages. One such advantage is that utility consumption information can be immediately provided to a user. Such a configuration can be advantageous compared to other systems which periodically upload data to a remote data collection site for processing. In particular embodiments, presently disclosed systems continuously provide data to a user interface, allowing the user to immediately view current utility consumption data. Because aspects of the present disclosure allow a user to track utility consumption associated with particular loads, such as appliances, the user can make informed decisions about their utility consumption.

It is to be understood that the above discussion provides a detailed description of various embodiments. The above descriptions will enable those skilled in the art to make many departures from the particular examples described above to provide apparatuses constructed in accordance with the present disclosure. The embodiments are illustrative, and not intended to limit the scope of the present disclosure. The scope of the present disclosure is rather to be determined by the scope of the claims as issued and equivalents thereto.

We claim:

1. A utility monitoring method comprising:
measuring an amount of a first utility consumed by a first device at a first time to determine a first utility amount consumed by the first device;
measuring an amount of a second utility, which may be the same as the first utility, consumed by a second device at a second time, which may be the same as the first time, to determine a second utility amount consumed by the second device;
identifying a relationship between the first and second devices from the relative timing of the utility consumption of the first device at the first time and the utility consumption of the second device at the second time; and
determining the identity of the first device based at least in part on the utility amounts consumed by the first and second devices at the first and second times and the relationship identified between the first and second devices,
wherein the first and second devices are different appliances.

2. The utility monitoring method of claim 1, wherein determining the identity of the first device based on the utility amounts consumed by the first and second devices at the first and second times, comprises:
determining a first hypothetical consumption scenario comprising the consumption of a first possible first device and a first possible second device;
determining a second hypothetical consumption scenario comprising the consumption of a second possible first device and a second possible second device;
comparing the first and second hypothetical consumption scenarios;
selecting the first or second hypothetical consumption scenario as the more probable scenario; and
identifying the first device based on the selected hypothetical consumption scenario.

3. The utility monitoring method of claim 2, further comprising receiving information about the accuracy of the identification of the first device based on the selected hypothetical consumption scenario and modifying the selection of the first or second hypothetical consumption scenario as the more probable scenario based on that information.

4. The utility monitoring method of claim 1, wherein the first utility is different from the second utility.

5. The utility monitoring method of claim 1, further comprising measuring an amount of a third utility, which may be the same as either the first utility or the second utility, consumed by the second device.

6. The utility monitoring method of claim 1, further comprising measuring an amount of the first utility consumed by the first device at a third time, which may be the same as the second time if the second time is different than the first time.

7. The utility monitoring method of claim 1, wherein the first utility is the same as the second utility.

8. The utility monitoring method of claim 1, wherein identifying the relationship between the first and second devices comprises determining that the consumption of the first utility by the first device is closely followed in time by the consumption of the second utility by the second device.

9. The utility monitoring method of claim 1, wherein determining the identity of the first device further comprises identifying a time of day in which the first and second times occurred.

10. A utility monitoring method comprising:
measuring an amount of a first utility consumed by a first device at a first time during a first use to determine a first utility amount consumed by the first device;
measuring an amount of a second utility, which may be the same as the first utility, consumed by a second device at a second time during a second use to determine a second utility amount consumed by the second device, the second device being different than the first device and the second time being sequentially after the first time; and
identifying a time-based relationship between the first use of the first device and the second use of the second device; and
determining the identity of the second device based at least in part on the identified time-based relationship and the utility amounts consumed by the first and second devices at the first and second times,
wherein the first and second devices are different appliances.

11. The utility monitoring method of claim 10, wherein the time-based relationship is identified based on the amount of time that passes between the first and second uses.

12. The utility monitoring method of claim 11, wherein the first utility is different from the second utility.

13. The utility monitoring method of claim 12, wherein the first utility comprises water and the second utility comprises electricity.

14. The utility monitoring method of claim 11, wherein the first utility is the same as the second utility.

15. The utility monitoring method of claim 14, wherein the first and second utilities are electricity.

16. The utility monitoring method of claim 10, wherein the determining of the identity of the second device further comprises identifying the time of day in which the second use occurs.

* * * * *